I. N. Dennisson,

Rivet,

N° 46,297.   Patented Feb. 7. 1865.

Witnesses;
W. M. Gooding
Richard Lee

Inventor;
I. N. Dennisson

UNITED STATES PATENT OFFICE.

JOHN N. DENNISSON, OF NEWARK, NEW JERSEY, ASSIGNOR TO HIMSELF AND GOULD BROTHERS, OF SAME PLACE.

IMPROVEMENT IN RIVETS.

Specification forming part of Letters Patent No. 46,297, dated February 7, 1865.

*To all whom it may concern:*

Be it known that I, JOHN N. DENNISSON, of the city of Newark, in the county of Essex and State of New Jersey, have made an Improvement in Rivets; and I do hereby declare the following to be a full and exact description of the same, reference being herein had to the drawings which accompany this specification and make part of the same.

The nature of my improvement consists in so shaping the head and the washer of a rivet as to greatly increase the hold thereof upon the material riveted, especially in the case of belting and hose.

Figure 1:
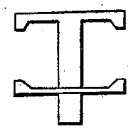
Figure 2:
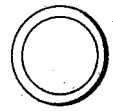
Figure 3:
Figure 4:

In the drawings, Figure 1 is a sectional view of a rivet and washer with a square projecting rim; Fig. 2, a flat view of the same. Figs. 3 and 4 show the form of projections to adapt the rivet to the varied substances that may be riveted with the improved rivet.

It is found in practice where a strain comes on any elastic material that is fastened with rivets, especially in leather, that by the slipping thereof under the head of the rivet the holes through which the shank of the rivet passes will elongate, and finally will tear from hole to hole. This difficulty has been materially increased in fire-engine hose by the introduction of steam fire-engines. Material of the ordinary thickness cannot bear the additional strain to which the application of steam-power subjects it, and the new difficulty is fully met by forming the head and the washer of the rivets with a projecting edge, which, when pressed into the material riveted, takes hold of a much larger portion of the material, preventing the elongating of the shank-holes by keeping the material from slipping from under the head and the washer.

What I claim, and desire to secure, is—

A rivet or a washer with a projecting edge, constructed in the manner and for the purpose hereinabove specified.

JOHN N. DENNISSON.

Witnesses:
WM. M. GOODING,
RICHARD LEE.